(12) United States Patent
Li

(10) Patent No.: US 12,446,028 B2
(45) Date of Patent: Oct. 14, 2025

(54) METHOD AND DEVICE FOR DETERMINING AN UPLINK TRANSMISSION RESOURCE FOR A DEMODULATION REFERENCE SIGNAL

(71) Applicant: Beijing Xiaomi Mobile Software Co., Ltd., Beijing (CN)

(72) Inventor: Yuanyuan Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 410 days.

(21) Appl. No.: 18/000,081

(22) PCT Filed: Jun. 4, 2020

(86) PCT No.: PCT/CN2020/094452
§ 371 (c)(1),
(2) Date: Nov. 28, 2022

(87) PCT Pub. No.: WO2021/243662
PCT Pub. Date: Dec. 9, 2021

(65) Prior Publication Data
US 2023/0217432 A1    Jul. 6, 2023

(51) Int. Cl.
*H04W 72/1268*    (2023.01)
*H04L 5/00*    (2006.01)
(52) U.S. Cl.
CPC ....... *H04W 72/1268* (2013.01); *H04L 5/0048* (2013.01)
(58) Field of Classification Search
CPC ......... H04W 72/1268; H04W 72/0446; H04W 72/21; H04L 5/0048; H04L 5/0083; H04L 5/0091; H04L 5/0023; H04L 5/0053
(Continued)

(56) References Cited

U.S. PATENT DOCUMENTS

2018/0069652 A1    3/2018  Yamamoto et al.
2018/0110041 A1    4/2018  Bendlin et al.
(Continued)

FOREIGN PATENT DOCUMENTS

CN    107370579 A    11/2017
CN    108401485 A    8/2018
(Continued)

OTHER PUBLICATIONS

"DMRS and multiplexing methods for NR long PUCCH with more than 2 bits," Proceedings of the 3GPP TSG RAN WG1 NR#90bis Meeting, Sharp, R1-1718416, Oct. 9, 2017, Prague, Czech Republic, 3 pages.
(Continued)

*Primary Examiner* — Candal Elpenord
(74) *Attorney, Agent, or Firm* — McCoy Russell LLP

(57) ABSTRACT

A method for determining an uplink transmission resource for a demodulation reference signal includes: determining symbols occupied by a physical uplink control channel (PUCCH) in N consecutive slots, N being a positive integer; and from the symbols occupied by the PUCCH, determining a second symbol set of symbols occupied by a demodulation reference signal (DMRS), the number of the symbols in the second symbol set being less than the number of symbols in a first symbol set, the first symbol set being determined according to a format of the PUCCH, the number of the symbols occupied by the PUCCH, and a distribution mode of the symbols occupied by the DMRS corresponding to the format of the PUCCH.

18 Claims, 7 Drawing Sheets

(58) Field of Classification Search
USPC .................................................. 370/329–330
See application file for complete search history.

(56) References Cited

U.S. PATENT DOCUMENTS

| | | | |
|---|---|---|---|
| 2018/0124815 A1* | 5/2018 | Papasakellariou | ............................ |
| | | | H04W 72/0446 |
| 2018/0220414 A1 | 8/2018 | Yin et al. | |
| 2019/0150143 A1* | 5/2019 | Yin | ........................ H04L 5/0048 |
| | | | 370/329 |
| 2020/0092876 A1 | 3/2020 | Cho et al. | |
| 2020/0163078 A1 | 5/2020 | Jiang et al. | |
| 2021/0282137 A1* | 9/2021 | Wang | ..................... H04W 72/23 |
| 2022/0085939 A1* | 3/2022 | Mondal | ................. H04W 72/21 |

FOREIGN PATENT DOCUMENTS

| | | |
|---|---|---|
| CN | 108811118 A | 11/2018 |
| CN | 109474402 A | 3/2019 |
| CN | 109474999 A | 3/2019 |
| CN | 109525999 A | 3/2019 |
| CN | 110999183 A | 4/2020 |
| WO | 2020032462 A1 | 2/2020 |

OTHER PUBLICATIONS

"Long PUCCH for more than 2 UCI bits," Proceedings of the 3GPP TSG RAN WG1 Meeting 91, Intel Corporation, R1-1720089, Nov. 27, 2017, Reno, Nevada, 7 pages.

* cited by examiner

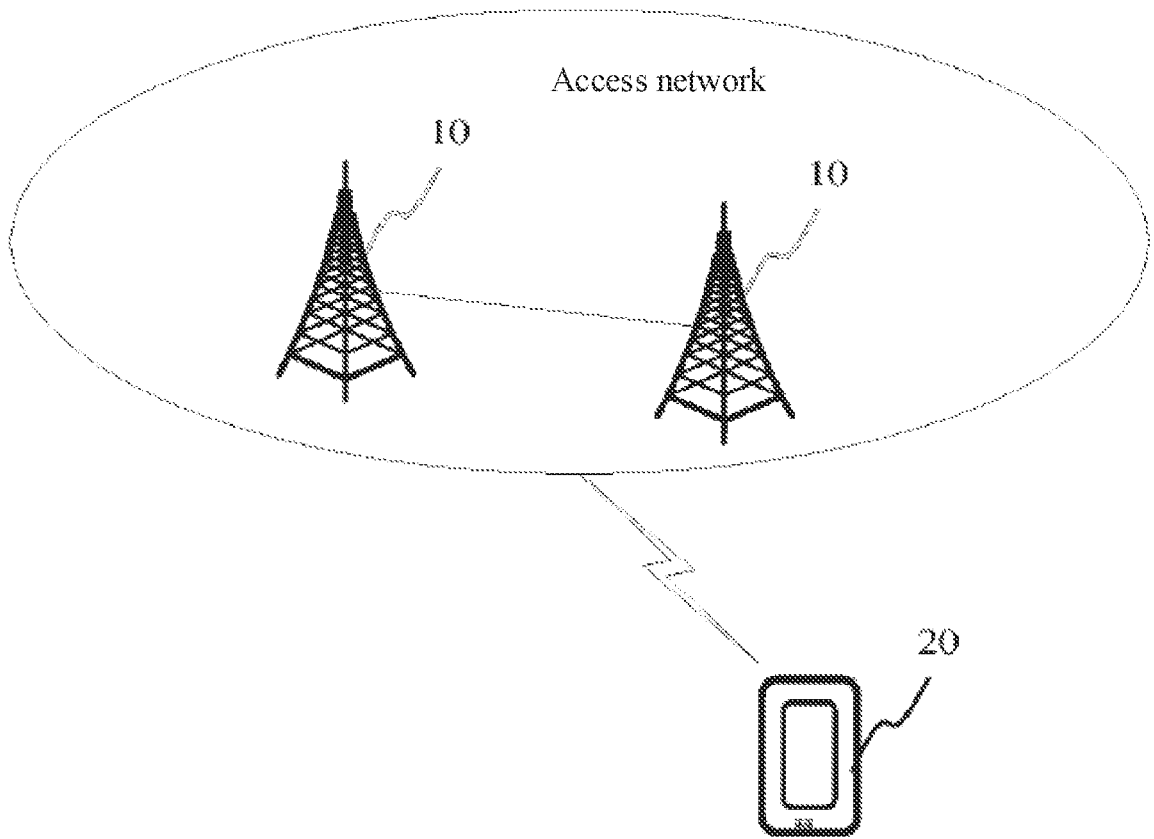

Fig. 1 symbols occupied by a physical uplink control channel (PUCCH) in N consecutive time slots is determined, N being a positive integer — 201 a second symbol set of symbols occupied by the demodulation reference signal (DMRS) is determined from the symbols occupied by the PUCCH, the number of the symbols in the second symbol set being less than the number of symbols in a first symbol set, and the first symbol set being determined according to a format of the PUCCH, the number of the symbols occupied by the PUCCH, and a distribution mode of the symbols occupied by the DMRS corresponding to the format of the PUCCH — 202

Fig. 2

METHOD AND DEVICE FOR DETERMINING AN UPLINK TRANSMISSION RESOURCE FOR A DEMODULATION REFERENCE SIGNAL

CROSS REFERENCE TO RELATED APPLICATION

The present application is a U.S. National Phase of International Application No. PCT/CN2020/094452 entitled "METHOD AND DEVICE FOR USE IN DETERMINING UPLINK TRANSMISSION RESOURCE FOR DEMODULATION REFERENCE SIGNAL," and filed on Jun. 4, 2020. The entire contents of the above-listed application are hereby incorporated by reference for all purposes.

BACKGROUND

A demodulation reference signal (DMRS) is used for demodulating uplink and downlink data, and the DMRS in a physical uplink control channel (PUCCH) is used for demodulating uplink data.

SUMMARY

The disclosure relates to the technical field of communication, in particular relates to a method and apparatus for determining an uplink transmission resource for a demodulation reference signal. The technical solutions are as follows:

a first aspect of an example of the disclosure provides a method for determining an uplink transmission resource for a demodulation reference signal, the method includes:
  determining symbols occupied by a physical uplink control channel (PUCCH) in N consecutive time slots, N being a positive integer; and
  determining a second symbol set of symbols occupied by the demodulation reference signal (DMRS) from the symbols occupied by the PUCCH, the number of the symbols in the second symbol set being less than the number of symbols in a first symbol set, and the first symbol set being determined according to a format of the PUCCH, the number of the symbols occupied by the PUCCH, and a distribution mode of the symbols occupied by the DMRS corresponding to the format of the PUCCH.

A second aspect of an example of the disclosure provides an apparatus for determining an uplink transmission resource for a demodulation reference signal, the apparatus includes: a processor; and a memory for storing a processor-executable instruction. The processor is configured to load and execute the executable instruction:
  determine symbols occupied by a physical uplink control channel (PUCCH) in N consecutive time slots, N being a positive integer; and
  determine a second symbol set of symbols occupied by the demodulation reference signal (DMRS) from the symbols occupied by the PUCCH, the number of the symbols in the second symbol set being less than the number of symbols in a first symbol set, and the first symbol set being determined according to a format of the PUCCH, the number of the symbols occupied by the PUCCH, and a distribution mode of the symbols occupied by the DMRS corresponding to the format of the PUCCH.

A third aspect of an example of the disclosure provides a non-transitory computer-readable storage medium. In response to determining an instruction in the computer-readable storage medium is executed by a processor, the processor is caused to:
  determine symbols occupied by a physical uplink control channel (PUCCH) in N consecutive time slots, N being a positive integer; and
  determine a second symbol set of symbols occupied by the demodulation reference signal (DMRS) from the symbols occupied by the PUCCH, the number of the symbols in the second symbol set being less than the number of symbols in a first symbol set, and the first symbol set being determined according to a format of the PUCCH, the number of the symbols occupied by the PUCCH, and a distribution mode of the symbols occupied by the DMRS corresponding to the format of the PUCCH.

It should be understood that the above general description and the following detailed description are only illustrative and explanatory, and cannot limit the disclosure.

BRIEF DESCRIPTION OF THE DRAWINGS

The accompanying drawings here are incorporated into the description as a constituent part of the description, illustrate examples conforming to the disclosure, and serve to explain principles of the disclosure along with the description.

FIG. 1 is a block diagram of a communication system shown according to an example;

FIG. 2 is a flow diagram of a method for determining an uplink transmission resource for a demodulation reference signal shown according to an example;

DETAILED DESCRIPTION

Figure 3:
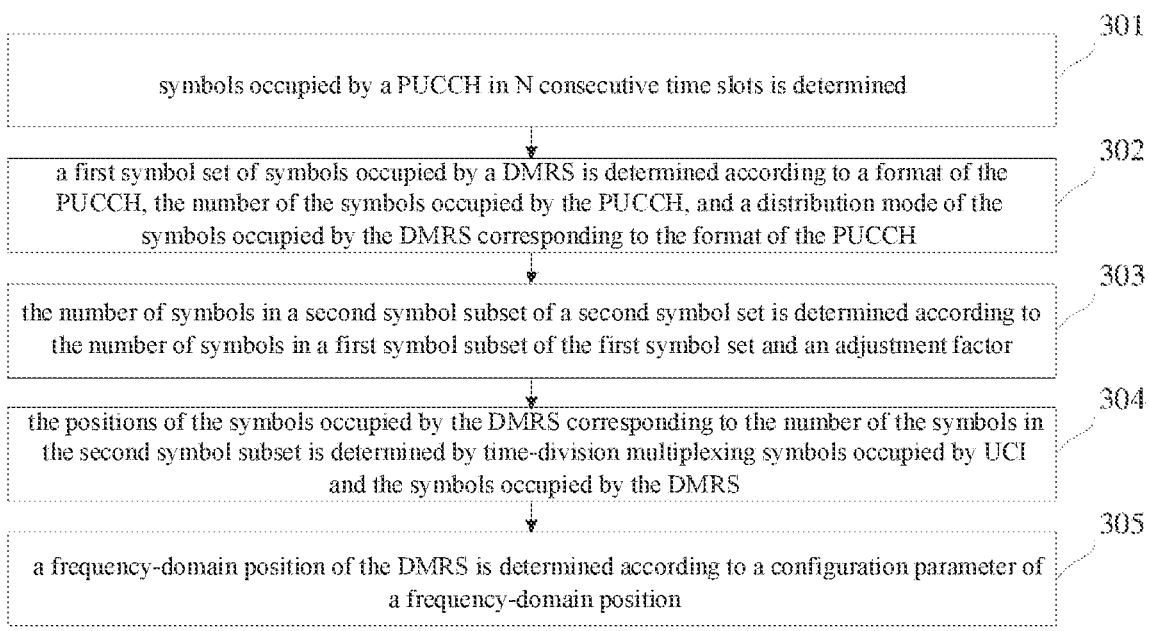
FIG. 3 is a flow diagram of a method for determining an uplink transmission resource for a demodulation reference signal shown according to an example.

The examples will be described in detail here and shown in the accompanying drawings illustratively. When the following descriptions relate to the accompanying drawings, unless otherwise specified, the same numeral in different accompanying drawings denotes the same or similar element. The implementations described in the following examples do not denote all implementations consistent with the disclosure. On the contrary, the implementations are merely examples of apparatuses and methods consistent with some aspects of the disclosure described in detail in the appended claims.

The terms used in the examples of the disclosure are merely used for describing the specific examples, and are not intended to limit the examples of the disclosure. The singular forms such as "a/an" and "this" used in the examples of the disclosure and the appended claims are also intended to include the plural forms, unless otherwise clearly stated in the context. It should also be understood that the term "and/or" used here refers to and contains any or all possible combinations of one or more associated listed items.

It should be understood that although the terms "first", "second", "third", etc. can be employed in the examples of the disclosure to describe various information, such information should not be limited to these terms. These terms are merely used for distinguishing the same type of information from each other. For example, first information can be also referred to as second information, and similarly, second information can be also referred to as first information, without departing from the scope of the examples of the disclosure. Depending on the context, the word "if" as used here can be interpreted as "in the case of", "in the situation that" or "in response to determining".

It should be understood that although in the examples of the disclosure, the steps are described as numbered for ease of understanding, these numbers do not denote an order in which the steps are executed, and do not denote that sequentially numbered steps are required to be executed together. It should be understood that one or more of the sequentially numbered steps can be independently executed to solve the corresponding technical problems and achieve the predetermined technical solutions. Even if a plurality of steps are illustratively listed together in the accompanying drawings, these steps are not required to be executed together; and the accompanying drawings merely illustratively list these steps together for ease of understanding.

In the new radio (NR) technology, there are five formats of PUCCHs. Among the five formats, the proportion of symbols occupied by the DMRS in PUCCH formats 1-4 is large, that is, the overhead of the DMRS is large, in some scenarios, for example, in a scenario in which the data size of uplink control information (UCI) is large, or uplink coverage is limited, the large overhead of the DMRS will cause a decrease in uplink communication efficiency of a communication system.

Examples of the disclosure provide a method and apparatus for determining an uplink transmission resource for a demodulation reference signal and a computer-readable storage medium, which may improve uplink communication efficiency.

FIG. 1 is a block diagram of a communication system shown according to an example. With reference to FIG. 1, the mobile communication system may include: an access network device 10 and a terminal 20.

The access network device 10 is deployed in a radio access network for providing a radio access function for the terminal 20. The access network device may be a base station (BS). The access network device 10 may be in wireless communication with the terminal 20 by means of one or more antennae. The access network device 10 may provide communication coverage for a geographic area in which the access network device is located. The base station may include a macro base station, a micro base station, a relay station, an access point, and other different types of base stations. In some examples, the base station may be referred to by those skilled in the art as a base transceiver, a wireless base station, an access point, a wireless transceiver, a basic service set (BSS), an extended service set (ESS), a node B, an evolved node B (eNB or eNodeB), or some other appropriate terms. Illustratively, in a 5th generation (5G) system, a base station is referred to as a next generation node B (gNB). For ease of description, in an example of the disclosure, the above apparatuses for providing a wireless communication function for terminals 20 are collectively referred to as an access network device.

The terminals 20 may be distributed in the whole mobile communication system, and each terminal 20 may be stationary or mobile. The terminal 20 may be further referred to by those skilled in the art as a mobile station, a subscriber station, a mobile unit, a subscriber unit, a wireless unit, a remote unit, a mobile device, user equipment, a wireless device, a wireless communication device, a remote device, a mobile subscriber station, an access terminal, a mobile terminal, a wireless terminal, a remote terminal, a handheld device, a user agent, a mobile client, a client, or some other appropriate terms. The terminal 20 may be a cellular telephone, a personal digital assistant (PDA), a wireless modem, a wireless communication device, a handheld device, a tablet computer, a laptop computer, a cordless telephone, a wireless local loop (WLL) station, etc. The terminal 20 may be in communication with the access network device 10 in the mobile communication system.

The access network device 10 and the terminal 20 may be in communication with each other through a new radio technology, for example, through a cellular technology. A communication link between the access network device 10 and the terminal 20 may include: downlink (DL) transmission from the access network device 10 to the terminal 20, and/or uplink (UP) transmission from the terminal 20 to the access network device 10. The downlink transmission may be further referred to as a forward link transmission, and the uplink transmission may be further referred to as a reverse link transmission. In some examples, the downlink transmission may include transmission of discovery signals, and the discovery signals may include reference signals and/or synchronization signals.

The above mobile communication system shown in FIG. 1 may be a long term evolution (LTE) system, a next generation evolution system based on the LTE system, such as an LTE-Advanced (LTE-A) system or a 5th generation (5G) system (further referred to as an NR system), or a next generation evolution system based on the 5G system, such as a beyond 5th generation (B5G) system or a 6th generation (6G) system. In an example of the disclosure, the terms "system" and "network" are often used interchangeably, but those skilled in the art can understand their meanings.

The communication system and the service scenario described in an example of the disclosure are used for more clearly explaining the technical solution of an example of the disclosure, and do not constitute a limitation on the technical solution provided in an example of the disclosure. Those of ordinary skill in the art would know that with the evolution of the communication system and the appearance of a new service scenario, the technical solution provided in an example of the disclosure is also applicable to similar technical problems.

FIG. 2 is a flow diagram of a method for determining an uplink transmission resource for a demodulation reference signal shown according to an example. The method may be executed by the above terminal. As shown in FIG. 2, the method includes the following steps:

Step 201: symbols occupied by a physical uplink control channel (PUCCH) in N consecutive time slots is determined, N being a positive integer; and Step 202: a second symbol set of symbols occupied by the demodulation reference signal (DMRS) is determined from the symbols occupied by the PUCCH, the number of the symbols in the second symbol set being less than the number of symbols in a first symbol set, and the first symbol set being determined according to a format of the PUCCH, the number of the symbols occupied by the PUCCH, and a distribution mode of the symbols occupied by the DMRS corresponding to the format of the PUCCH.

In the related art, symbols occupied by a DMRS (that is, symbols in a first symbol set) are determined according to a format of a PUCCH, the number of symbols occupied by the PUCCH and a distribution mode of the symbols occupied by the DMRS corresponding to the format of the PUCCH. In an example of the disclosure, the number of the symbols in the second symbol set is less than the number of the symbols in the first symbol set, and the DMRS is configured according to the symbols in the second symbol set, such that the number of symbols occupied by the DMRS is reduced. In the symbols occupied by the PUCCH, the remaining symbols except for the symbols occupied by the DMRS are used by the UCI. If the number of the symbols occupied by the DMRS is reduced, more symbols may be used by the UCI in the same time slot, which is conducive to improvement in transmission efficiency of the UCI, and is suitable for scenarios in which the uplink coverage of the terminal is limited and a data size of the UCI is large.

In some examples, the second symbol set is a subset of the first symbol set.

In some examples, the determining a second symbol set of symbols occupied by the DMRS from the symbols occupied by the PUCCH includes:

determining the number of symbols in a second symbol subset of the second symbol set according to the number of symbols in a first symbol subset of the first symbol set and an adjustment factor, the first symbol subset and the second symbol subset corresponding to any one of the N consecutive time slots; and determining positions of the symbols occupied by the DMRS in a time slot corresponding to the second symbol subset, according to the number of the symbols in the second symbol subset.

In some examples, the determining the number of symbols in a second symbol subset of the second symbol set according to the number of symbols in a first symbol subset of the first symbol set and an adjustment factor includes:

obtaining the number of the symbols in the second symbol subset by rounding up the quotient of the number of the symbols in the first symbol subset and the adjustment factor.

In some examples, the adjustment factor is configured by an access network device; or the adjustment factor is selected by a terminal from a pre-configured adjustment factor set.

In some examples, the determining positions of the symbols occupied by the DMRS in a time slot corresponding to the second symbol subset, according to the number of the symbols in the second symbol subset includes:

determining the positions of the symbols occupied by the DMRS corresponding to the number of the symbols in the second symbol subset by time-division multiplexing symbols occupied by uplink control information (UCI) and the symbols occupied by the DMRS.

In some examples, the method further includes:

determining a frequency-domain position of the DMRS according to a configuration parameter of a frequency-domain position, the configuration parameter of a frequency-domain position being 1/M, M being a positive integer greater than 4, and the configuration parameter of a frequency-domain position being used for indicating that every M resource elements include a resource element corresponding to one demodulation reference signal and resource elements corresponding to (M−1) pieces of uplink control information.

In some examples, the configuration parameter of a frequency-domain position is configured by the access network device; or the configuration parameter of a frequency-domain position is selected by the terminal from a pre-configured parameter set.

In some examples, M is equal to 6 or 12.

In some examples, N is greater than 1, and the determining a second symbol set of symbols occupied by the DMRS from the symbols occupied by the PUCCH includes:

taking some symbols in some of the N consecutive time slots as the symbols in the second symbol set.

In some examples, the taking some symbols in some of the N consecutive time slots as the symbols in the second symbol set includes:

taking some symbols in a first time slot of the N consecutive time slots as the symbols in the second symbol set; or selecting some time slots from the N consecutive time slots according to a time slot interval configuration, and taking some symbols in the selected time slots as the symbols in the second symbol set.

In some examples, in the first time slot including the symbols in the second symbol set, the symbols in the second symbol set are located at a portion, close to a second time slot, of the symbols occupied by the PUCCH in a corresponding time slot, the second time slot being a time slot not including the symbols in the second symbol set.

In some examples, the time slot interval configuration is configured by an access network device, or the time slot interval configuration is determined by the terminal according to a movement speed of the terminal.

In some examples, the number of symbols in the second symbol set located in the same time slot is inversely proportional to an uplink transmission code rate of the terminal.

In some examples, the determining a second symbol set of symbols occupied by the DMRS from the symbols occupied by the PUCCH includes:

determining a second symbol set of the symbols occupied by the DMRS from the symbols occupied by the PUCCH, in response to determining that uplink coverage of the terminal is limited; or determining a second symbol set of the symbols occupied by the DMRS from the symbols occupied by the PUCCH, in response to determining that uplink coverage of the terminal is limited, and a movement speed of the terminal is less than a speed threshold; or determining a second symbol set of the symbols occupied by the DMRS from the symbols occupied by the PUCCH, in response to determining that a movement speed of the terminal is less than a speed threshold; or determining a second symbol set of the symbols occupied by the DMRS from the symbols occupied by the PUCCH, in response to receiving a trigger message transmitted by the access network device.

It should be noted that the above steps 201 and 202 and the above optional steps may be arbitrarily combined.

An example of the disclosure further provides a method for transmitting configuration information. The method may be executed by the above access network device. The method includes: transmitting configuration information, the configuration information including at least one of the following information: an adjustment factor, a configuration parameter of a frequency-domain position, and a time slot interval configuration.

Figure 8:
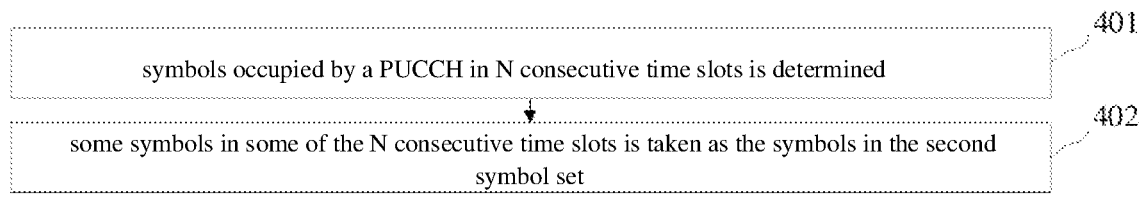
FIG. 8 is a flow diagram of a method for determining an uplink transmission resource for a demodulation reference signal shown according to an example.

For details of such information, references may be made to the examples of FIG. 3 or 8.

FIG. 3 is a flow diagram of a method for determining an uplink transmission resource for a demodulation reference signal shown according to an example. As shown in FIG. 3, the method includes the following steps:

Step 301: symbols occupied by a PUCCH in N consecutive time slots is determined.

N being a positive integer.

Further, step 301 may include: determining the symbols occupied by the PUCCH in the N consecutive time slots according to PUCCH configuration information.

Illustratively, the PUCCH configuration information may be transmitted by an access network device. For example, the PUCCH configuration information may be transmitted by the access network device through high-layer signaling (for example, radio resource control (RRC) signaling).

Illustratively, the PUCCH configuration information includes time slot indexes, a start symbol index, the number of persistent symbols, frequency-domain positions, etc.

Illustratively, symbols occupied by one PUCCH are located in one time slot. One time slot may include at most two PUCCHs, and at least one of the two PUCCHs is a short PUCCH.

Step 302: a first symbol set of symbols occupied by a DMRS is determined according to a format of the PUCCH, the number of the symbols occupied by the PUCCH, and a distribution mode of the symbols occupied by the DMRS corresponding to the format of the PUCCH.

In NR technology, formats of the PUCCH include format 0, format 1, format 2, format 3 and format 4. Since the format 0 does not include a symbol carrying the DMRS, but the symbols occupied by the DMRS are required to be determined in an example of the disclosure, the format of the PUCCH in an example of the disclosure is at least one of the format 1, the format 2, the format 3 and the format 4.

The formats 1 to 4 of the PUCCH will be briefly introduced below in combination with FIGS. 4 to 7.

Figure 4:
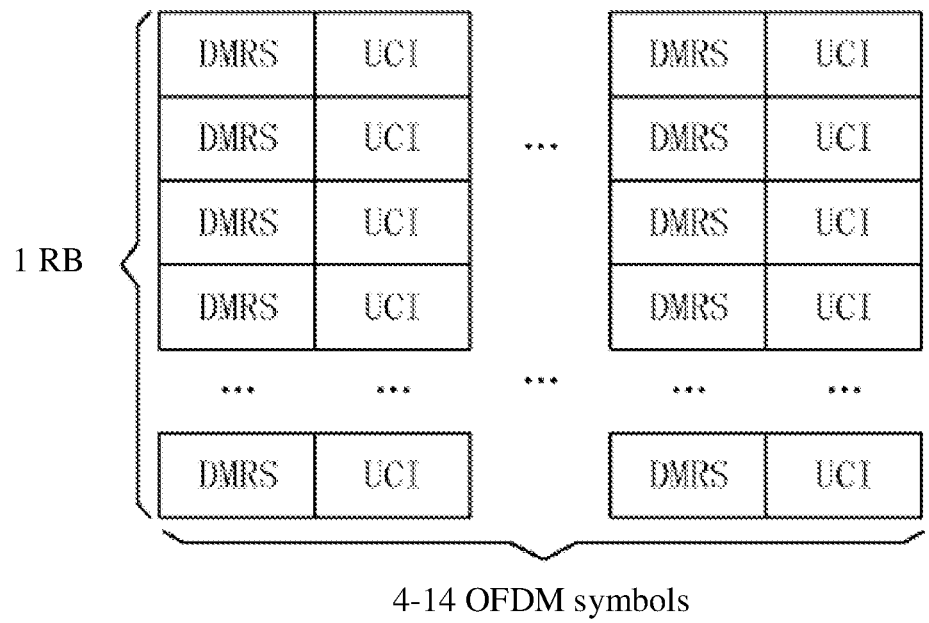
FIG. 4 is a schematic structural diagram of format 1 of a physical uplink control channel (PUCCH) on a time-frequency resource.

FIG. 4 is a schematic structural diagram of format 1 of a PUCCH on a time-frequency resource. As shown in FIG. 4, the format 1 of a PUCCH occupies 4-14 orthogonal frequency division multiplexing (OFDM) symbols in a time domain. In a time domain, UCI and a DMRS are placed at intervals, and OFDM symbols occupied by the UCI and the DMRS are equally divided as much as possible. In addition, the format 1 occupies all 12 subcarriers of 1 resource block (RB) in a frequency domain.

For the format 1 of a PUCCH having different time-domain lengths, no matter whether PUCCH frequency modulation is configured or not, the OFDM symbols occupied by the DMRS are OFDM symbols with even indexes of symbols occupied by a PUCCH (indexes of the symbols occupied by the PUCCH start from 0).

Thus, in the case that the format of a PUCCH is the format 1, a distribution mode of the symbols occupied by the DMRS corresponding to the format 1 is the symbols with even indexes of the symbols occupied by the PUCCH, that is, the symbols in the first symbol set are the symbols with even indexes of the symbols occupied by the PUCCH.

Figure 5:
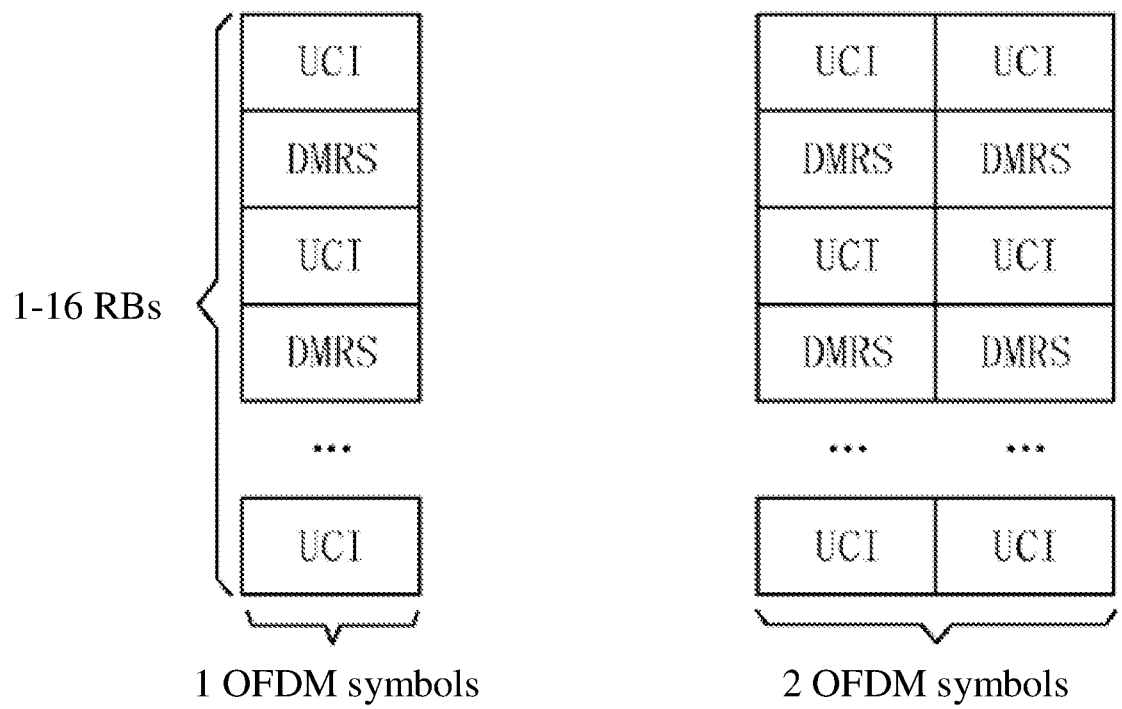
FIG. 5 is a schematic structural diagram of format 2 of a PUCCH on a time-frequency resource.

FIG. 5 is a schematic structural diagram of format 2 of a PUCCH on a time-frequency resource. As shown in FIG. 5, in the format 2 of a PUCCH, transmission is carried out by combining UCI and a DMRS, that is, UCI and the DMRS occupy the same symbols, and both occupy all symbols corresponding to the PUCCH. Moreover, a resource element (RE) occupied by the UCI and an RE occupied by the DMRS are frequency-division multiplexed (FDM) in a frequency domain. In order to improve a load capacity of the format 2, transmission may be carried out in the frequency domain by 1-16 RBs.

Thus, when the format of the PUCCH is the format 2, the distribution mode of symbols occupied by the DMRS corresponding to the format 2 is all the symbols occupied by the PUCCH, that is, the symbols in the first symbol set are all the symbols occupied by the PUCCH.

Figure 6:
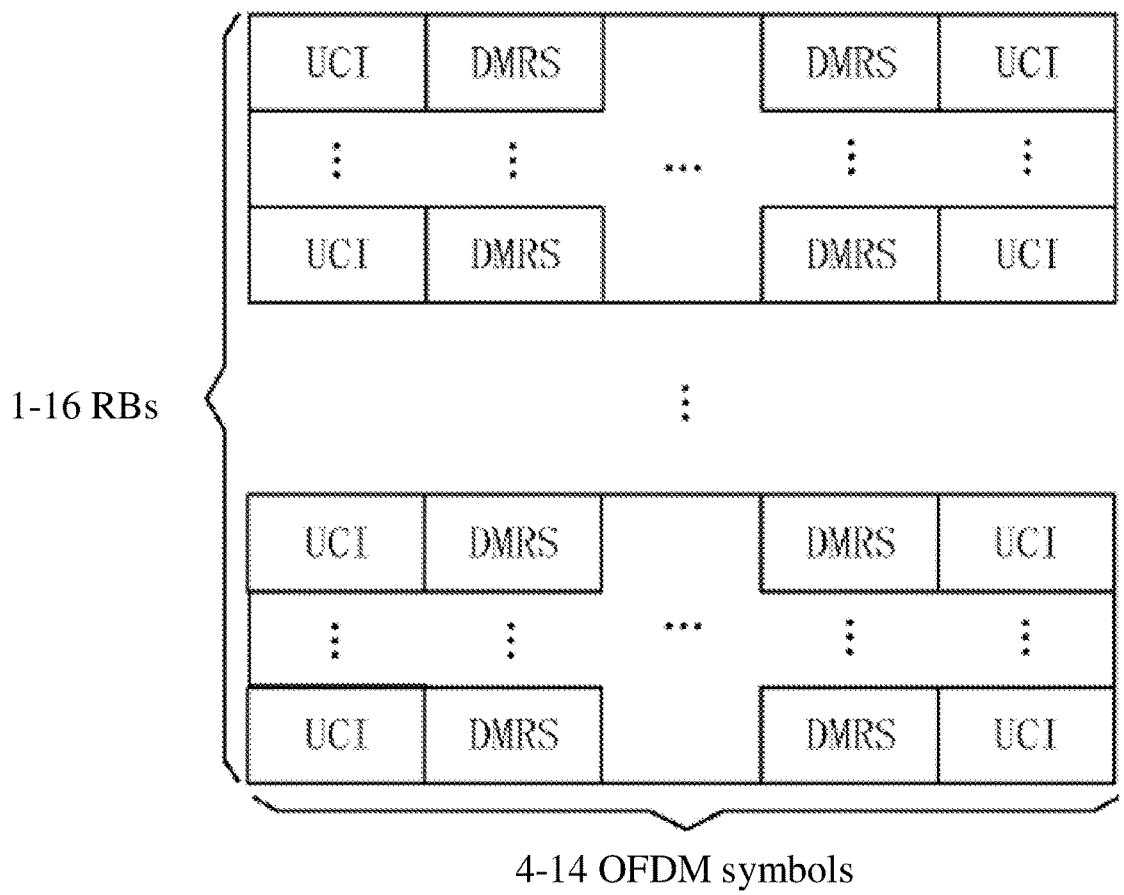
FIG. 6 is a schematic structural diagram of format 3 of a PUCCH on a time-frequency resource.

FIG. 6 is a schematic structural diagram of format 3 of a PUCCH on a time-frequency resource. As shown in FIG. 6, the format 3 of a PUCCH occupies 4-14 symbols in a time domain, and a DMRS is uniformly distributed in a middle of UCI. All 12*N subcarriers of N RBs are occupied in a frequency domain (N is less than or equal to 16, and N is certainly the product of powers of 2, 3 and 5). The format 3 is a format capable of loading the most UCI transmission, and there is no multiplexing between users.

For the format 3 of a PUCCH having different time-domain lengths, positions of OFDM symbols occupied by the DMRS in the format 3 of a PUCCH is determined by three factors, that is, the number of OFDM symbols occupied by the PUCCH, whether PUCCH frequency modulation is configured, and whether an additional DMRS is configured.

Figure 7:
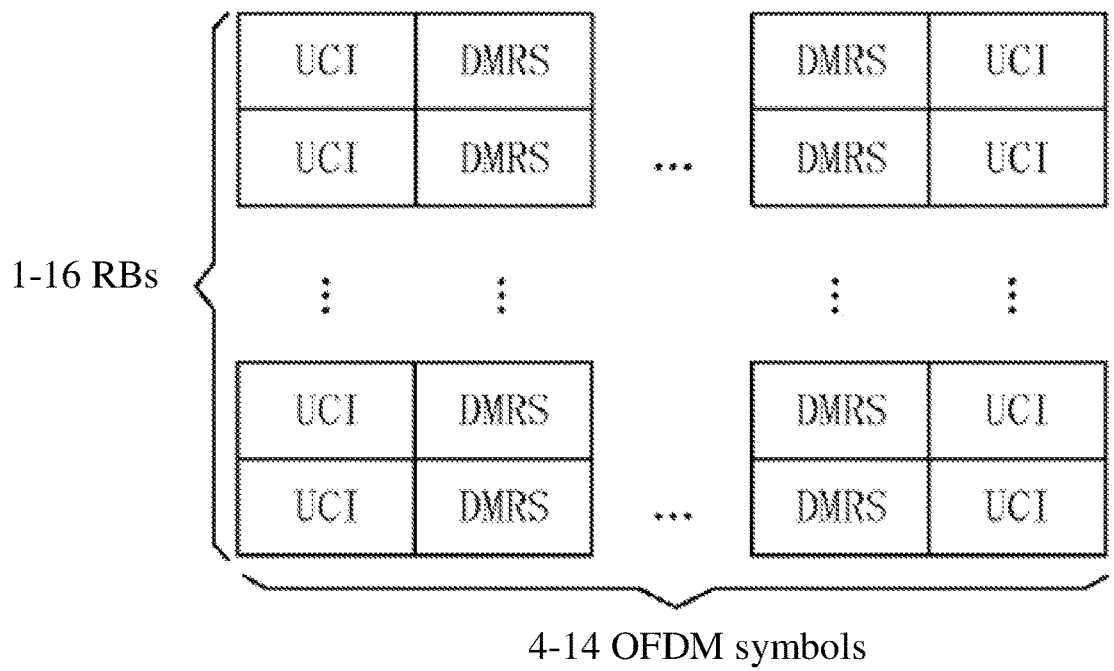
FIG. 7 is a schematic structural diagram of format 4 of a PUCCH on a time-frequency resource.

FIG. 7 is a schematic structural diagram of format 4 of a PUCCH on a time-frequency resource. As shown in FIG. 7, the format 4 of a PUCCH occupies 4-14 OFDM symbols in a time domain. The OFDM symbols of UCI and a DMRS are time-division multiplexed. The format 4 occupies all 12 subcarriers of 1 RB in a frequency domain.

For the format 4 of a PUCCH having different time-domain lengths, the positions of the OFDM symbols occupied by the DMRS in the format 4 of a PUCCH is determined by three factors, that is, the number of OFDM symbols occupied by the PUCCH, whether PUCCH frequency modulation is configured, and whether an additional DMRS is configured.

Thus, in some examples, if the format of a PUCCH is the format 3 or 4, the distribution mode of the symbols occupied by the DMRS corresponding to the formats 3 and 4 is that the symbols occupied by the UCI and the symbols occupied by the DMRS are time-division multiplexed, that is, the symbols in the first symbol set are the symbols occupied by the DMRS determined from the symbols occupied by the PUCCH according to a time-division multiplexing relation between the symbols occupied by the UCI and the symbols occupied by the DMRS.

Here, the time-division multiplexing relation between the symbols occupied by the UCI and the symbols occupied by the DMRS is determined by three factors, that is, the number of OFDM symbols occupied by the PUCCH, whether PUCCH frequency modulation is configured, and whether an additional DMRS is configured.

Step 303: the number of symbols in a second symbol subset of a second symbol set is determined according to the number of symbols in a first symbol subset of the first symbol set and an adjustment factor.

The first symbol subset and the second symbol subset correspond to any one of the N consecutive time slots.

Illustratively, the step 303 may include: obtaining the number of the symbols in the second symbol subset by rounding up the quotient of the number of the symbols in the first symbol subset and the adjustment factor.

That is, the number of the symbols in the second symbol subset is determined according to equation (1).

$$X = \lfloor N_{DMRS}/\text{factor} \rfloor \quad (1)$$

X is the number of the symbols in the second symbol subset, $N_{DMRS}$ is the number of the symbols in the first symbol subset, and factor is the adjustment factor.

That is to say, in an example of the disclosure, the symbols occupied by the DMRS are determined by taking time slot as unit (or taking PUCCH as unit), such that the number of the symbols occupied by the DMRS in each PUCCH is reduced.

In one possible implementation, the adjustment factor is configured by an access network device. Illustratively, the access network device may transmit the value of the adjustment factor to the terminal through high-layer signaling, and correspondingly, the method further includes: receiving high-layer signaling transmitted by the access network device for indicating the value of the adjustment factor.

In another possible implementation, the adjustment factor is selected by the terminal from a pre-configured adjustment factor set.

Illustratively, the adjustment factor set may include at least one element, and the value of the element in the adjustment factor set may be determined through simulation, such as 2 and 3.

Through this method, the access network device may determine the position of the DMRS in the frequency domain through blind detection.

Step 304: the positions of the symbols occupied by the DMRS corresponding to the number of the symbols in the second symbol subset is determined by time-division multiplexing symbols occupied by UCI and the symbols occupied by the DMRS.

Here, time-division multiplexing of the symbol occupied by the UCI and the symbol occupied by the DMRS may mean that every Y consecutive symbols include 1 symbol occupied by the DMRS and (Y−1) symbols occupied by the UCI, and the position of the 1 symbol occupied by the DMRS in the consecutive symbols is constant, for example, is a first symbol in the Y symbols.

It should be noted that in the plurality of symbols occupied by the PUCCH, except for the symbols occupied by the DMRS, the remaining symbols are symbols occupied by the UCI, such that the UCI and the DMRS may be uniformly mapped to the time domain resources through the step 304.

Through the steps 303 and 304, the second symbol set of the symbols occupied by the DMRS is determined from the symbols occupied by the PUCCH.

In some examples, in the case that the format of the PUCCH is the format 2, density of the DMRS in the time domain is reduced, and density of the DMRS in the frequency domain may be also reduced, so as to further reduce the overhead of the DMRS. Thus, the method may further include:

Step 305: a frequency-domain position of the DMRS is determined according to a configuration parameter of a frequency-domain position, the configuration parameter of a frequency-domain position being 1/M, M being a positive integer greater than 4, and the configuration parameter of a frequency-domain position being used for indicating that every M resource elements include a resource element corresponding to one DMRS and resource elements corresponding to (M−1) pieces of UCI.

In the related art, in format 2 of a PUCCH, M is equal to 4, and subcarrier indexes occupied by a DMRS in a frequency domain are 1, 4, 7 . . . (the subcarrier indexes start from 0), that is, there is an RE of a DMRS in every 4 REs, and the remaining REs are used for UCI.

Illustratively, M is equal to 6 or 12, etc. In the case that M is equal to 6 or 12, density of the resource elements corresponding to the DMRS is reduced compared with that in the case that M is equal to 4 in the related art. Moreover, since the number of subcarriers corresponding to the PUCCH is an integer multiple of 12, the value of M being 6 or 12 may also guarantee uniformity of distribution of the DMRS symbols in the frequency domain.

It should be noted that in some examples, the density of the DMRS may be reduced in the time domain, while the density of the DMRS in the frequency domain is kept unchanged, that is, M is equal to 4.

Illustratively, in an example of the disclosure, the parameter set is {¼, ⅙, 1/12}. The terminal may select whether to reduce the density of the DMRS in the frequency domain according to actual requirements.

In some examples, the configuration parameter of a frequency-domain position is configured by the access network device; or the configuration parameter of a frequency-domain position is selected by the terminal from a pre-configured parameter set.

For a configuration method of the access network device and a selection method of the terminal, references may be made to the related contents of the adjustment factor, and the detailed description is omitted here.

In some examples, the above step 303 may include:

Determining the second symbol set of the symbols occupied by the DMRS from the symbols occupied by the PUCCH, in response to determining that uplink coverage of the terminal is limited; or determining the second symbol set of the symbols occupied by the DMRS from the symbols occupied by the PUCCH, in response to determining that uplink coverage of the terminal is limited, and a movement speed of the terminal is less than a speed threshold; or determining the second symbol set of the symbols occupied by the DMRS from the symbols occupied by the PUCCH, in response to determining that a movement speed of the terminal is less than a speed threshold; or determining the second symbol set of the symbols occupied by the DMRS from the symbols occupied by the PUCCH, in response to receiving a trigger message transmitted by the access network device.

That is, in the method, the uplink coverage of the terminal may be limited; or the uplink coverage of the terminal may be limited, and the movement speed of the terminal is less than the speed threshold; or the movement speed of the terminal is less than the speed threshold; or trigger is carried out by receiving the trigger message transmitted by the access network device. If trigger is not carried out, for example, the uplink coverage of the terminal is not limited, the movement speed of the terminal is not less than the speed threshold, and the trigger message transmitted by the access network device is not received, the first symbol set is used as the symbols occupied by the DMRS in the PUCCH.

Illustratively, different trigger conditions may be used for PUCCHs in different formats. For example, for the format 1, the format 3 and the format 4, when the uplink coverage of the terminal is limited, the second symbol set of the symbols occupied by the DMRS may be determined from the symbols occupied by the PUCCH. For the format 2, in the case that the uplink coverage of the terminal is limited, and the movement speed of the terminal is less than the speed threshold, the second symbol set of the symbols occupied by the DMRS may be determined from the symbols occupied by the PUCCH.

In a possible implementation, whether the uplink coverage of the terminal is limited may be determined according to the position of the terminal. For example, if the terminal is located at an edge of a cell, it is indicated that the uplink coverage of the terminal is limited, and if the terminal is located at a center of the cell, it is determined that the uplink coverage of the terminal is not limited.

In another possible implementation, whether the uplink coverage of the terminal is limited may also be determined according to path loss between the terminal and the access network device. If the path loss is greater than a loss threshold, it is indicated that the uplink coverage of the terminal is limited, and if the path loss is not greater than the loss threshold, it is indicated that the uplink coverage of the terminal is not limited. The path loss may be detected by the terminal, and a detection method is not limited in the disclosure as long as the path loss may be determined.

It should be noted that a method for determining that the uplink coverage of the terminal is limited is not limited in an example of the disclosure, and any method in the related art may be used.

The movement speed of the terminal may be determined through the following method: determining the position of the terminal through distance measurement; and determining the movement speed of the terminal according to the position change of the terminal in a time unit and duration of the time unit. The method for distance measurement and positioning by a terminal includes but is not limited to: time of flight (TOF) distance measurement, time of arrival (TOA) distance measurement, time difference of arrival (TDOA) distance measurement, etc.

The trigger message is used for notifying the terminal to start a DMRS configuration mode, that is, to configure the DMRS on the symbols in the second symbol set. Illustratively, the trigger message may be transmitted by the access network device through high-layer signaling (for example, RRC message).

When the above trigger condition is satisfied, the DMRS is configured on the symbols in the second symbol set, that is, the density of the DMRS is reduced, and a method for configuring the DMRS may be selected according to the actual situations of the terminal, so as to satisfy requirements of a communication system.

Alternatively, the above steps 303 to 305 may be replaced with the following steps: obtaining the second symbol set by selecting some symbols from the first symbol set. That is, the second symbol set is a subset of the first symbol set. The method for selecting some symbols from the first symbol set may be: selecting every other symbol in the first symbol set in an ascending order of the symbol indexes. For example, if the symbol indexes in the first symbol set are 0, 2 and 4, the selected symbol indexes are 0 and 4.

In the related art, symbols occupied by a DMRS (that is, symbols in a first symbol set) are determined according to a format of a PUCCH, the number of symbols occupied by the PUCCH and a distribution mode of the symbols occupied by the DMRS corresponding to the format of the PUCCH. In an example of the disclosure, the number of symbols in a second symbol set is less than the number of symbols in the first symbol set, and the DMRS is configured according to the symbols in the second symbol set, such that the number of symbols occupied by the DMRS is reduced. In the symbols occupied by the PUCCH, the remaining symbols except for the symbols occupied by the DMRS are used by the UCI. If the number of the symbols occupied by the DMRS is reduced, more symbols may be used by the UCI in the same time slot, which is conducive to improvement in transmission efficiency of the UCI, and is suitable for scenarios in which the uplink coverage of the terminal is limited and a data size of the UCI is large.

Moreover, the number of the symbols in the second symbol set is obtained by rounding up the quotient of the number of the symbols in the first symbol set and the adjustment factor, and the symbols occupied by the DMRS and the UCI of the number of symbols in the second symbol set are uniformly distributed in the time domain, such that the symbols occupied by the DMRS in the PUCCH of each time slot are uniformly distributed, and reliability of communication is improved.

FIG. 8 is a flow diagram of a method for determining an uplink transmission resource for a demodulation reference signal shown according to an example. The method may be executed by a terminal. As shown in FIG. 8, the method includes the following steps:

Step 401: symbols occupied by a PUCCH in N consecutive time slots is determined.

N being a positive integer greater than 1. For the related contents of the step 401, reference may be made to the above step 301, and the detailed description is omitted here.

Step 402: some symbols in some of the N consecutive time slots is taken as the symbols in the second symbol set.

In a possible implementation, the step 402 includes:

taking some symbols in a first time slot of the N consecutive time slots as the symbols in the second symbol set.

In another possible implementation, the step 402 includes:

selecting some time slots from the N consecutive time slots according to a time slot interval configuration, and taking some symbols in the selected time slots as the symbols in the second symbol set.

Here, the time slot interval configuration may be used for representing granularity of the time slots carrying the DMRS, that is, indicating the number of times slots between two adjacent time slots carrying the DMRS. For example, in the case that the time slot interval configuration is 2, if a first time slot of N consecutive time slots carries a DMRS, second and third time slots do not carry a DMRS, and a fourth time slot carries a DMRS.

In some examples, the time slot interval configuration is configured by an access network device, or the time slot interval configuration is determined by the terminal according to a movement speed of the terminal. For example, if the movement speed of the terminal is greater than a speed threshold, the time slot interval configuration is P1, and if the movement speed of the terminal is less than the speed threshold, the time slot interval configuration is P2, P1 and P2 being both positive integers, and P1 being less than P2.

In some examples, after the terminal selects the time slot interval configuration, the time slot interval configuration may be transmitted to the access network device through a control channel.

In some examples, in the first time slot including the symbols in the second symbol set, the symbols in the second symbol set are located at a portion, close to a second time slot, of the symbols occupied by the PUCCH in a corresponding time slot, the second time slot being a time slot not including the symbols in the second symbol set. Thus, for ease of consideration of all time slots corresponding to the PUCCH, the access network device may demodulate the UCI in the first time slot and the second time slot according to the DMRS in the first time slot.

In some examples, for the first time slot, the corresponding symbols in the second symbol set may be located in the middle or the tail of the symbols occupied by the PUCCH in the first time slot, that is, close to positions of the subsequent time slots not including the DMRS.

In some examples, for the time slots located in the middle of the N consecutive time slots selected according to the time slot interval configuration, the corresponding symbols in the second symbol set may be located at two ends of the symbols occupied by the PUCCH in these slots, that is, close to the time slots not including the DMRS.

Alternatively, the symbols in the second symbol set are also determined according to the number of symbols occupied by the PUCCH carried in the first time slot, the format of the PUCCH and the distribution mode of the symbols occupied by the DMRS corresponding to the format. For the related contents, reference may be made to the above step 302, and the detailed description is omitted here.

In some examples, the number of symbols in the second symbol set located in the same time slot is inversely proportional to an uplink transmission code rate of the terminal. That is, the higher the uplink transmission code rate, the less the number of symbols occupied by the DMRS in the same time slot; on the contrary, the lower the uplink transmission code rate, the greater the number of symbols occupied by DMRS in the same time slot. The high uplink transmission code rate indicates that a data size of UCI to be transmitted is large, and reduction in the number of symbols occupied by the DMRS is conducive to improvement in transmission efficiency of uplink data.

In some examples, the step 402 may be executed in the situation that a trigger condition is met, and the trigger condition includes but is not limited to: a trigger message transmitted by an access network device is received, or the terminal determines that a movement speed of the terminal is less than a speed threshold, etc.

For example, when the trigger message transmitted by the access network device is received, the DMRS may be carried in the first time slot, and not in the other time slots. For another example, in the case that the terminal determines that the movement speed of the terminal is greater than the speed threshold (that is, in a high-speed scenario), the DMRS is carried in each time slot, and in the case that the terminal determines that the movement speed of the terminal is less than the speed threshold (that is, in a low-speed scenario), the DMRS is carried in the first time slot, and not in the other time slots.

It should be noted that the trigger condition is not limited to these two trigger conditions, other trigger conditions in the related example of FIG. 3 may also be used, and the detailed description of the related contents is omitted here.

In the related art, symbols occupied by a DMRS (that is, symbols in a first symbol set) are determined according to a format of a PUCCH, the number of symbols occupied by the PUCCH and a distribution mode of the symbols occupied by the DMRS corresponding to the format of the PUCCH. In an example of the disclosure, the number of the symbols in the second symbol set is less than the number of the symbols in the first symbol set, and the DMRS is configured according to the symbols in the second symbol set, such that the number of symbols occupied by the DMRS is reduced. In the symbols occupied by the PUCCH, the remaining symbols except for the symbols occupied by the DMRS are used by the UCI. If the number of symbols occupied by the DMRS is reduced, more symbols may be used by the UCI in the same time slot, which is conducive to improvement in transmission efficiency of the UCI, and is suitable for scenarios in which the uplink coverage of the terminal is limited and a data size of the UCI is large.

In addition, by selecting some time slots from N consecutive time slots to carry a DMRS, the density of the DMRS may be reduced in terms of time slot granularity, such that the number of symbols occupied by the DMRS is reduced, and the symbols that may be used by the UCI are increased, which is conducive to improvement in transmission efficiency of the UCI.

Moreover, by making the number of the symbols in the second symbol set located in the same time slot inversely proportional to the uplink transmission code rate of the terminal, the number of the symbols occupied by the DMRS in each time slot may be reduced on the basis of reducing the density of the DMRS in terms of time slot granularity, so as to further increase the number of symbols that may be used by the UCI.

Figure 9:
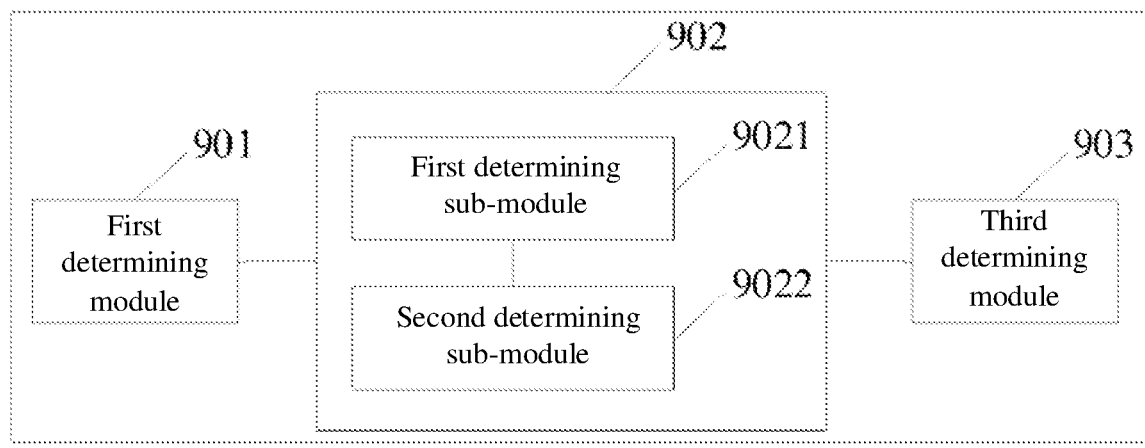
FIG. 9 is a schematic structural diagram of an apparatus for determining an uplink transmission resource for a demodulation reference signal shown according to an example.

FIG. 9 is a schematic structural diagram of an apparatus for determining an uplink transmission resource for a demodulation reference signal shown according to an example. The apparatus has a function of implementing the terminal in the above method example, and the function may be implemented by hardware or by executing corresponding software by the hardware. As shown in FIG. 9, the apparatus includes: a first determining module 901 and a second determining module 902.

The first determining module 901 is configured to determine symbols occupied by a PUCCH in N consecutive time slots, N being a positive integer. The second determining module 902 is configured to determine a second symbol set of symbols occupied by the DMRS from the symbols occupied by the PUCCH, the number of the symbols in the second symbol set being less than the number of symbols in a first symbol set, and the first symbol set being determined according to a format of the PUCCH, the number of the symbols occupied by the PUCCH, and a distribution mode of the symbols occupied by the DMRS corresponding to the format of the PUCCH.

In some examples, the second symbol set is a subset of the first symbol set.

In some examples, the second determining module 902 includes: a first determining sub-module 9021 and a second determining sub-module 9022. The first determining sub-module 9021 is configured to determine the number of symbols in a second symbol subset of the second symbol set according to the number of symbols in a first symbol subset of the first symbol set and an adjustment factor, the first symbol subset and the second symbol subset corresponding to any one of the N consecutive time slots. The second determining sub-module 9022 is configured to determine positions of the symbols occupied by the DMRS in a time slot corresponding to the second symbol subset, according to the number of the symbols in the second symbol subset.

In some examples, the first determining sub-module 9021 is configured to obtain the number of the symbols in the second symbol subset by rounding up the quotient of the number of the symbols in the first symbol subset and the adjustment factor.

In some examples, the adjustment factor is configured by an access network device; or the adjustment factor is selected by a terminal from a pre-configured adjustment factor set.

In some examples, the second determining sub-module 9022 is configured to determine the positions of the symbols occupied by the DMRS corresponding to the number of the symbols in the second symbol subset by time-division multiplexing symbols occupied by UCI and the symbols occupied by the DMRS.

In some examples, the apparatus further includes: a third determining module 903 configured to determine a frequency-domain position of the DMRS according to a configuration parameter of a frequency-domain position, the configuration parameter of a frequency-domain position being 1/M, M being a positive integer greater than 4, and the configuration parameter of a frequency-domain position being used for indicating that every M resource elements include a resource element corresponding to one demodulation reference signal and resource elements corresponding to (M−1) pieces of uplink control information.

In some examples, the configuration parameter of a frequency-domain position is configured by the access network device; or the configuration parameter of a frequency-domain position is selected by the terminal from a preconfigured parameter set.

In some examples, M is equal to 6 or 12.

In some examples, N is greater than 1, and the second determining module 902 is configured to take some symbols in some of the N consecutive time slots as the symbols in the second symbol set.

In some examples, the second determining module 902 is configured to take some symbols in a first time slot of the N consecutive time slots as the symbols in the second symbol set; or select some time slots from the N time slots according to a time slot interval configuration, and take some symbols in the selected time slots as the symbols in the second symbol set.

In some examples, in the first time slot including the symbols in the second symbol set, the symbols in the second symbol set are located at a portion, close to a second time slot, of the symbols occupied by the PUCCH in a corresponding time slot, the second time slot being a time slot not including the symbols in the second symbol set.

In some examples, the time slot interval configuration is configured by the access network device, or the time slot interval configuration is determined by the terminal according to a movement speed of the terminal.

In some examples, the number of symbols in the second symbol set located in the same time slot is inversely proportional to an uplink transmission code rate of the terminal.

In some examples, the second determining module 902 is configured to determine a second symbol set of symbols occupied by the DMRS from symbols occupied by the PUCCH, in response to determining that the uplink coverage of the terminal is limited; or determine a second symbol set of symbols occupied by the DMRS from the symbols occupied by the PUCCH, in response to determining that the uplink coverage of the terminal is limited and the movement speed of the terminal being less than a speed threshold; or determine a second symbol set occupied by DMRS from the symbols occupied by PUCCH, in response to the movement speed of the terminal being less than a speed threshold; or determine the second symbol set occupied by the DMRS from the symbols occupied by the PUCCH, in response to receiving the trigger message transmitted by the access network device.

In some examples, in the case that the format of the PUCCH is format 1, the symbols in the first symbol set are symbols with even indexes in the symbols occupied by the PUCCH; in the case that the format of the PUCCH is format 2, the symbols in the first symbol set are all the symbols occupied by the PUCCH; and in the case that the format of the PUCCH is format 3 or 4, the symbols in the first symbol set are the symbols occupied by the DMRS determined from the symbols occupied by the PUCCH according to a time-division multiplexing relation between the symbols occupied by the UCI and the symbols occupied by the DMRS.

Figure 10:
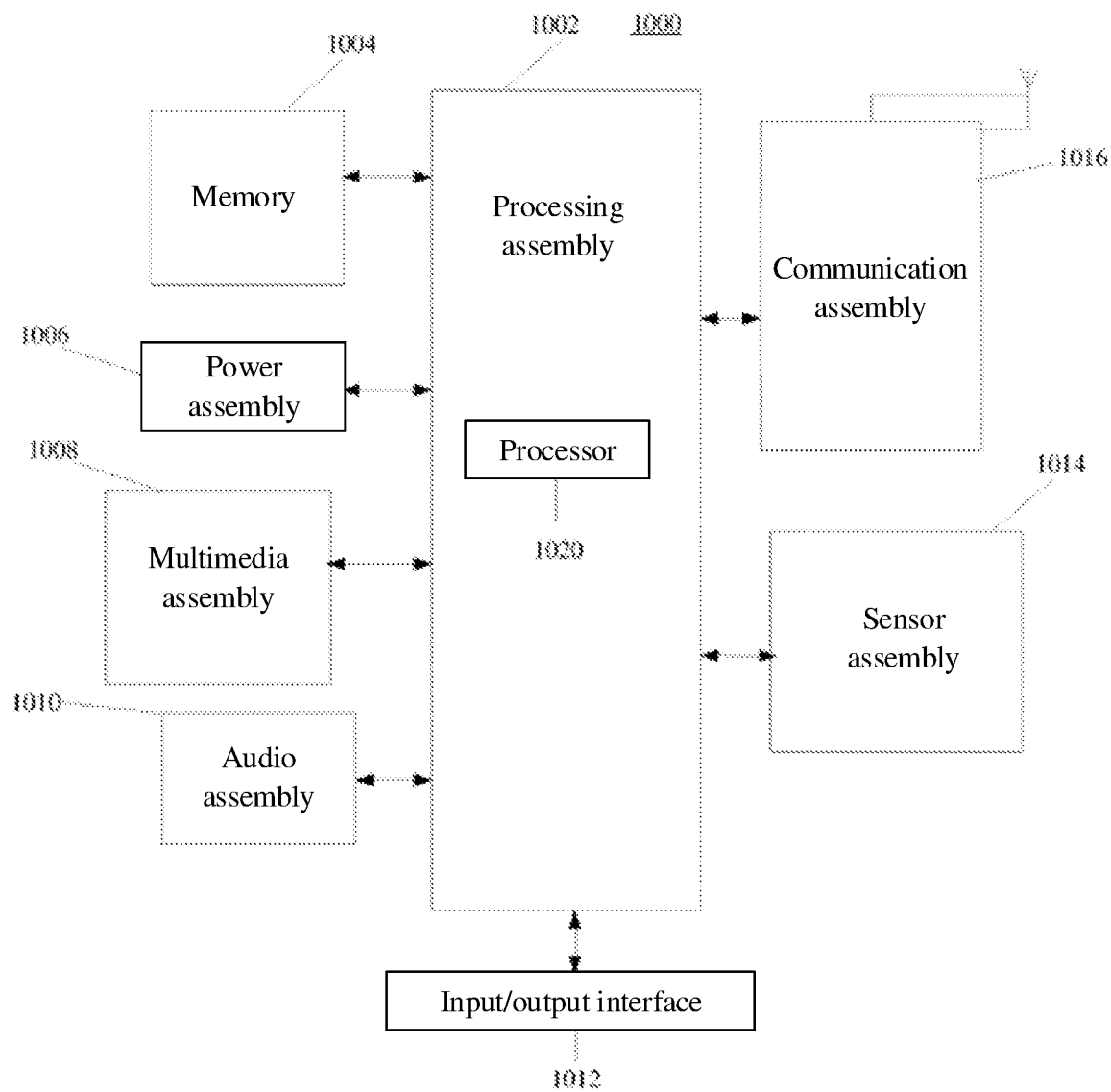
FIG. 10 is a block diagram of an apparatus for determining an uplink transmission resource for a demodulation reference signal shown according to an example.

FIG. 10 is a block diagram of an apparatus 1000 for determining an uplink transmission resource for a demodulation reference signal shown according to an example. The apparatus 1000 may be the above terminal. With reference to FIG. 10, the apparatus 1000 for determining an uplink transmission resource for a demodulation reference signal may include one or more of the following assemblies: a processing assembly 1002, a memory 1004, a power assembly 1006, a multimedia assembly 1008, an audio assembly 1010, an input/output (I/O) interface 1012, a sensor assembly 1014, and a communication assembly 1016.

The processing assembly 1002 generally controls the overall operation of the apparatus 1000 for determining an uplink transmission resource for a demodulation reference signal, such as operations associated with display, telephone call, data communication, camera operation, and recording operation. The processing assembly 1002 may include one or more processors 1020 to execute instructions, so as to complete all or some of the steps of the above method. In addition, the processing assembly 1002 may include one or more modules, so as to facilitate interactions between the processing assembly 1002 and other assemblies. For example, the processing assembly 1002 may include a multimedia module, so as to facilitate interaction between the multimedia assembly 1008 and the processing assembly 1002.

The memory 1004 is configured to store various types of data, so as to support operations on the apparatus 1000 for determining an uplink transmission resource for a demodulation reference signal. Examples of such data include instructions for any application or method operating on the apparatus 1000 for determining an uplink transmission resource for a demodulation reference signal, contact data, phonebook data, messages, pictures, video, etc. The memory 1004 may be implemented by any type of volatile or non-volatile storage devices or their combinations, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power assembly 1006 is used for providing power for various assemblies of the apparatus 1000 for determining an uplink transmission resource for a demodulation reference signal. The power assembly 1006 may include a power management system, one or more power supplies, and other assemblies associated with generation, management, and power distribution of the apparatus 1000 for determining an uplink transmission resource for a demodulation reference signal.

The multimedia assembly 1008 includes a screen providing an output interface between the apparatus 1000 for determining an uplink transmission resource for a demodulation reference signal and a user. In some examples, the screen may include a liquid crystal display (LCD) and a touch panel (TP). In the case that the screen includes a touch panel, the screen may be implemented as a touch screen, so as to receive an input signal from a user. The touch panel includes one or more touch sensors, so as to sense touches, swipes, and gestures on the touch panel. The touch sensor may sense a boundary of a touch or swipe, and may also detect time and pressure associated with the touch or swipe. In some examples, the multimedia assembly 1008 includes a front facing camera and/or a rear facing camera. When the apparatus 1000 for determining an uplink transmission resource for a demodulation reference signal is in an operation mode, such as a shooting mode or a video mode, the front facing camera and/or the rear facing camera may receive external multimedia data. Each of the front facing camera and the rear facing camera may be a fixed optical lens system or have focusing and optical zooming capabilities.

The audio assembly 1010 is configured to output and/or input audio signals. For example, the audio assembly 1010 includes a microphone (MIC) configured to receive an external audio signal when the apparatus 1000 for determining an uplink transmission resource for a demodulation reference signal is in an operational mode, such as a call mode, a recording mode, and a voice recognition mode. The received audio signals may be further stored in the memory 1004 or transmitted by the communication assembly 1016. In some examples, the audio assembly 1010 further includes a loudspeaker for outputting audio signals.

The I/O interface 1012 provides an interface between the processing assembly 1002 and peripheral interface modules, such as keyboards, click wheels and buttons. These buttons may include, but are not limited to: a home button, a volume button, a start button, and a lock button.

The sensor assembly 1014 includes one or more sensors configured to provide state assessment of various aspects for the apparatus 1000 for determining an uplink transmission resource for a demodulation reference signal. For example, the sensor assembly 1014 may detect an on/off state of the apparatus 1000 for determining an uplink transmission resource for a demodulation reference signal, and a relative positioning of assemblies. For example, the assembly may be a display and keypad of the apparatus 1000 for determining an uplink transmission resource for a demodulation reference signal. The sensor assembly 1014 may be further used for detecting a change in a position of the apparatus 1000 for determining an uplink transmission resource for a demodulation reference signal or an assembly of the apparatus 1000 for determining an uplink transmission resource for a demodulation reference signal, presence or absence of contact between a user and the apparatus 1000 for determining an uplink transmission resource for a demodulation reference signal, orientation or acceleration/deceleration of the apparatus 1000 for determining an uplink transmission resource for a demodulation reference signal, and a temperature change of the apparatus 1000 for determining an uplink transmission resource for a demodulation reference signal. The sensor assembly 1014 may include a proximity sensor configured to detect the presence of a nearby object in the absence of any physical contact. The sensor assembly 1014 may further include a light sensor, such as a complementary metal oxide semiconductor (CMOS) or charge coupled device (CCD) image sensor for being used in imaging applications. In some examples, the sensor assembly 1014 may further include an acceleration sensor, a gyroscopic sensor, a magnetic sensor, a pressure sensor, or a temperature sensor.

The communication assembly 1016 is configured to facilitate wireless communication between the apparatus 1000 for determining an uplink transmission resource for a demodulation reference signal and other devices. In an example of the disclosure, the communication assembly 1016 may access a wireless network based on a communication standard, such as 2G, 3G, 4G, or 5G, or their combination, so as to implement random access. In an example, the communication assembly 1016 receives a broadcast signal or broadcast related information from an external broadcast management system by a broadcast channel. In some examples, the communication assembly 1016 further includes a near field communication (NFC) module.

In an example, the apparatus 1000 for determining an uplink transmission resource for a demodulation reference signal may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic elements, so as to execute the above method for determining an uplink transmission resource for a demodulation reference signal.

An example further provides a non-transitory computer-readable storage medium including an instruction, such as the memory 1004 including an instruction, and the above instruction may enable the processor 1020 of the apparatus 1000 for determining an uplink transmission resource for a demodulation reference signal to execute the above method for determining an uplink transmission resource for a demodulation reference signal. For example, the non-transitory computer-readable storage medium may be a read-only memory (ROM), a random access memory (RAM), a compact disc read-only memory (CD-ROM), a magnetic tape, a floppy disk, an optical data storage device, etc.

Figure 11:
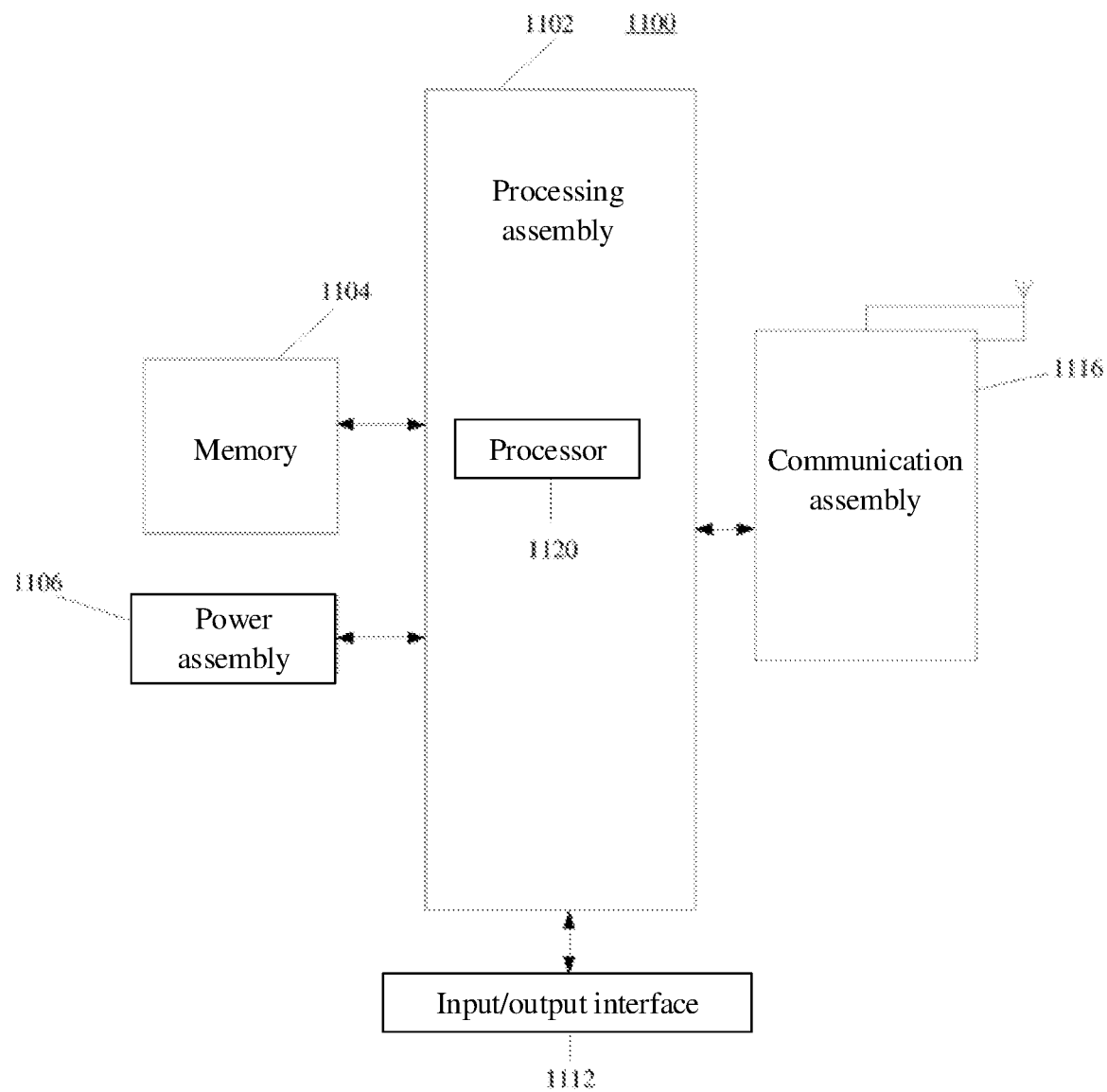
FIG. 11 is a block diagram of an apparatus for transmitting configuration information shown according to an example.

FIG. 11 is a block diagram of an apparatus 1100 for transmitting configuration information shown according to an example. The apparatus 1100 may be the above access network device. With reference to FIG. 11, the apparatus 1100 for transmitting configuration information may include one or more of the following assemblies: a processing assembly 1102, a memory 1104, a power assembly 1106, an input/output (I/O) interface 1112, and a communication assembly 1116.

The processing assembly 1102 generally controls the overall operation of the apparatus 1100 for determining an uplink transmission resource for a demodulation reference signal, such as operations associated with display, telephone call, data communication, camera operation, and recording operation. The processing assembly 1102 may include one or more processors 1120 to execute instructions, so as to complete all or some of the steps of the above method. Further, the processing assembly 1102 may include one or more modules, so as to facilitate interactions between the processing assembly 1102 and other assemblies. For example, the processing assembly 1102 may include a multimedia module, so as to facilitate an interaction between the multimedia assembly 1108 and the processing assembly 1102.

The memory 1104 is configured to store various types of data, so as to support operations on the apparatus 1100 for determining an uplink transmission resource for a demodulation reference signal. The memory 1104 may be implemented by any type of volatile or non-volatile storage devices or their combinations, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power assembly 1106 is used for providing power for various assemblies of the apparatus 1100 for determining an uplink transmission resource for a demodulation reference signal. The power assembly 1106 may include a power management system, one or more power supplies, and other assemblies associated with generation, management, and power distribution of the apparatus 1100 for determining an uplink transmission resource for a demodulation reference signal.

The I/O interface 1112 provides an interface between the processing assembly 1102 and peripheral interface modules, such as keyboards, click wheels and buttons. These buttons may include, but are not limited to: a home button, a volume button, a start button, and a lock button.

The communication assembly 1116 is configured to facilitate wireless communication between access network devices and other devices. In an example of the disclosure, the communication assembly 1116 may provide a wireless network based on a communication standard, such as 2nd generation (2G), 3rd generation (3G), 4th generation (4G), or 5G, or their combination, so as to be connected with a terminal device.

In an example, the apparatus 1100 for determining an uplink transmission resource for a demodulation reference signal may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic elements, so as to execute the above method for determining an uplink transmission resource for a demodulation reference signal.

An example further provides a non-transitory computer-readable storage medium including an instruction, such as the memory 1104 including an instruction, and the above instruction may enable the processor 1120 of the apparatus 1100 for transmitting configuration information to execute the above method for transmitting configuration information. For example, the non-transitory computer-readable storage medium may be a read-only memory (ROM), a random access memory (RAM), a compact disc read-only memory (CD-ROM), a magnetic tape, a floppy disk, an optical data storage device, etc.

An example of the disclosure further provides a communication system. The communication system includes an access network device and a terminal. The access network device is the apparatus for transmitting configuration information provided in the example as shown in FIG. 11. The terminal is an apparatus for determining an uplink transmission resource for a demodulation reference signal provided in the example as shown in FIG. 10.

Those skilled in the art could easily conceive of other implementation solutions of the disclosure upon consideration of the description and the disclosure disclosed in the implementation. The disclosure is intended to cover any variations, uses or adaptive changes of the disclosure, which follow the general principles of the disclosure and include common general knowledge or customary technical means in the art that is not disclosed in the disclosure. The description and the examples are to be regarded as illustrative merely, and the true scope and spirit of the disclosure are indicated by the following claims.

It should be understood that the disclosure is not limited to a precise structure that has been described above and illustrated in the accompanying drawings, and can have various modifications and changes without departing from the scope of the disclosure. The scope of the disclosure is limited by the appended claims merely.

The invention claimed is:

1. A method for determining an uplink transmission resource for a demodulation reference signal, comprising:
   determining symbols occupied by a physical uplink control channel (PUCCH) in N consecutive time slots, N being a positive integer; and
   determining a second symbol set of symbols occupied by the demodulation reference signal (DMRS) from the symbols occupied by the PUCCH, a number of the symbols in the second symbol set being less than a number of symbols in a first symbol set, and the first symbol set being determined according to a format of the PUCCH, a number of the symbols occupied by the PUCCH, and a distribution mode of the symbols occupied by the DMRS corresponding to the format of the PUCCH;
   wherein the determining a second symbol set of symbols occupied by the DMRS from the symbols occupied by the PUCCH comprises:
      determining a number of symbols in a second symbol subset of the second symbol set according to a number of symbols in a first symbol subset of the first symbol set and an adjustment factor, the first symbol subset and the second symbol subset corresponding to any one of the N consecutive time slots; and
      determining positions of the symbols occupied by the DMRS in a time slot corresponding to the second symbol subset, according to the number of the symbols in the second symbol subset.

2. The method according to claim 1, wherein the second symbol set is a subset of the first symbol set.

3. The method according to claim 1, wherein the determining the number of symbols in the second symbol subset of the second symbol set according to the number of symbols in the first symbol subset of the first symbol set and the adjustment factor comprises:
   obtaining the number of the symbols in the second symbol subset by rounding up the quotient of the number of the symbols in the first symbol subset and the adjustment factor.

4. The method according to claim 1, wherein the adjustment factor is configured by an access network device; or the adjustment factor is selected by a terminal from a pre-configured adjustment factor set.

5. The method according to claim 1, wherein the determining positions of the symbols occupied by the DMRS in a time slot corresponding to the second symbol subset, according to the number of the symbols in the second symbol subset comprises:
   determining positions of the symbols occupied by the DMRS corresponding to the number of the symbols in the second symbol subset by time-division multiplexing symbols occupied by uplink control information (UCI) and the symbols occupied by the DMRS.

6. The method according to claim 1, further comprising:
   determining a frequency-domain position of the DMRS according to a configuration parameter of a frequency-domain position, the configuration parameter of a frequency-domain position being 1/M, M being a positive integer greater than 4, and the configuration parameter of a frequency-domain position being used for indicating that every M resource elements comprise a resource element corresponding to one demodulation reference signal and resource elements corresponding to (M−1) pieces of uplink control information.

7. The method according to claim 6, wherein the configuration parameter of a frequency-domain position is configured by an access network device; or the configuration parameter of a frequency-domain position is selected by a terminal from a pre-configured parameter set.

8. The method according to claim 6, wherein M is equal to 6 or 12.

9. The method according to claim 1, wherein N is greater than 1, and
the determining a second symbol set of symbols occupied by the DMRS from the symbols occupied by the PUCCH comprises:
taking some symbols in some of the N consecutive time slots as the symbols in the second symbol set.

10. The method according to claim 9, wherein the taking some symbols in some of the N consecutive time slots as the symbols in the second symbol set comprises:
taking some symbols in a first time slot of the N consecutive time slots as the symbols in the second symbol set; or
selecting some time slots from the N consecutive time slots according to a time slot interval configuration, and taking some symbols in the selected time slots as the symbols in the second symbol set.

11. The method according to claim 10, wherein in the first time slot comprising the symbols in the second symbol set, the symbols in the second symbol set are located at a portion, close to a second time slot, of the symbols occupied by the PUCCH in a corresponding time slot, the second time slot being a time slot not comprising the symbols in the second symbol set.

12. The method according to claim 10, wherein the time slot interval configuration is configured by an access network device, or the time slot interval configuration is determined by a terminal according to a movement speed of the terminal.

13. The method according to claim 10, wherein the number of symbols in the second symbol set located in the same time slot is inversely proportional to an uplink transmission code rate of a terminal.

14. The method according to claim 1, wherein the determining a second symbol set of symbols occupied by the DMRS from the symbols occupied by the PUCCH comprises:
determining a second symbol set of the symbols occupied by the DMRS from the symbols occupied by the PUCCH, in response to determining that uplink coverage of a terminal is limited; or
determining a second symbol set of the symbols occupied by the DMRS from the symbols occupied by the PUCCH, in response to determining that uplink coverage of the terminal is limited and a movement speed of the terminal is less than a speed threshold; or
determining a second symbol set of the symbols occupied by the DMRS from the symbols occupied by the PUCCH, in response to determining that a movement speed of the terminal is less than a speed threshold; or
determining a second symbol set of the symbols occupied by the DMRS from the symbols occupied by the PUCCH, in response to receiving a trigger message transmitted by an access network device.

15. An apparatus for determining an uplink transmission resource for a demodulation reference signal, comprising:
a processor; and
a memory for storing a processor-executable instruction; wherein the processor is configured to load and execute the processor-executable instruction to:
determine symbols occupied by a physical uplink control channel (PUCCH) in N consecutive time slots, N being a positive integer; and
determine a second symbol set of symbols occupied by the demodulation reference signal (DMRS) from the symbols occupied by the PUCCH, a number of the symbols in the second symbol set being less than a number of symbols in a first symbol set, and the first symbol set being determined according to a format of the PUCCH, a number of the symbols occupied by the PUCCH, and a distribution mode of the symbols occupied by the DMRS corresponding to the format of the PUCCH; and
wherein the processor is further configured to:
determine a number of symbols in a second symbol subset of the second symbol set according to a number of symbols in a first symbol subset of the first symbol set and an adjustment factor, the first symbol subset and the second symbol subset corresponding to any one of the N consecutive time slots; and
determine positions of the symbols occupied by the DMRS in a time slot corresponding to the second symbol subset, according to the number of the symbols in the second symbol subset.

16. The apparatus according to claim 15, wherein the second symbol set is a subset of the first symbol set.

17. The apparatus according to claim 15, wherein the processor is further configured to:
obtain the number of the symbols in the second symbol subset by rounding up the quotient of the number of the symbols in the first symbol subset and the adjustment factor.

18. A non-transitory computer-readable storage medium, wherein in response to determining an instruction in the computer-readable storage medium is executed by a processor, the processor is caused to:
determine symbols occupied by a physical uplink control channel (PUCCH) in N consecutive time slots, N being a positive integer; and
determine a second symbol set of symbols occupied by a demodulation reference signal (DMRS) from the symbols occupied by the PUCCH, a number of the symbols in the second symbol set being less than a number of symbols in a first symbol set, and the first symbol set being determined according to a format of the PUCCH, a number of the symbols occupied by the PUCCH, and a distribution mode of the symbols occupied by the DMRS corresponding to the format of the PUCCH;
wherein the processor is further caused to:
determine a number of symbols in a second symbol subset of the second symbol set according to a number of symbols in a first symbol subset of the first symbol set and an adjustment factor, the first symbol subset and the second symbol subset corresponding to any one of the N consecutive time slots; and
determine positions of the symbols occupied by the DMRS in a time slot corresponding to the second symbol subset, according to the number of the symbols in the second symbol subset.

* * * * *